United States Patent [19]

Brown et al.

[11] Patent Number: 4,935,062

[45] Date of Patent: * Jun. 19, 1990

[54] KAOLINITE AGGREGATION USING ORGANO-SILICON COMPOUNDS

[75] Inventors: Alan J. Brown, Milledgeville; Joshua O. Brannen; Wayne Andrews, both of Sandersville; Jerry R. May, Warthen, all of Ga.; Rasik H. Raythatha, Federal Way, Wash.

[73] Assignee: ECC America Inc., Atlanta, Ga.

[*] Notice: The portion of the term of this patent subsequent to Apr. 4, 2006 has been disclaimed.

[21] Appl. No.: 329,667

[22] Filed: Mar. 28, 1989

Related U.S. Application Data

[63] Continuation-in-part of Ser. No. 67,213, Jun. 26, 1987, Pat. No. 4,818,294.

[51] Int. Cl.$^5$ ............................................... C08B 14/04
[52] U.S. Cl. ........................... 106/487; 106/287.16; 106/486; 501/148
[58] Field of Search ............... 501/148; 106/486, 487, 106/287.16, 287.12, 287.14; 523/212; 524/447

[56] References Cited

U.S. PATENT DOCUMENTS 4,711,673 12/1987 Musselman et al. ................ 523/212
4,818,294 4/1989 Raythatha ........................... 106/487

Primary Examiner—Theodore Morris
Attorney, Agent, or Firm—Klauber & Jackson

[57] ABSTRACT

A particulate kaolin pigment which enhances gloss and printability properties when used as a coating pigment for paper and enhances light scattering and opacifying properties when incorporated as a filler in paper, is obtained by mixing a fine particle kaolin with an aggregating agent comprising an organic silicon compound such as tetramethoxy silane or tetraethoxy silane. The feed kaolin moisture content is in the range of above 2.0 to about 5.0%, preferably 2.5 to 4.0% by weight.

20 Claims, 8 Drawing Sheets

PARTICLE SIZE DISTRIBUTION OF AGGREGATED KAOLINITE PREPARED USING 1.0% TETRAMETHOXYSILANE

BRIGHTNESS vs. COAT WEIGHT

OPACITY vs. COAT WEIGHT

GLOSS vs. COAT WEIGHT

PRINT GLOSS vs. COAT WEIGHT

LITHO PRINT GLOSS vs. COAT WEIGHT

MOISTURE vs. 1/4 MICRON PSD

MOISTURE vs. 1/4 MICRON PSD

PARTICLE SIZE DISTRIBUTION
1.0% MOISTURE

PARTICLE SIZE DISTRIBUTION
1.7% MOISTURE

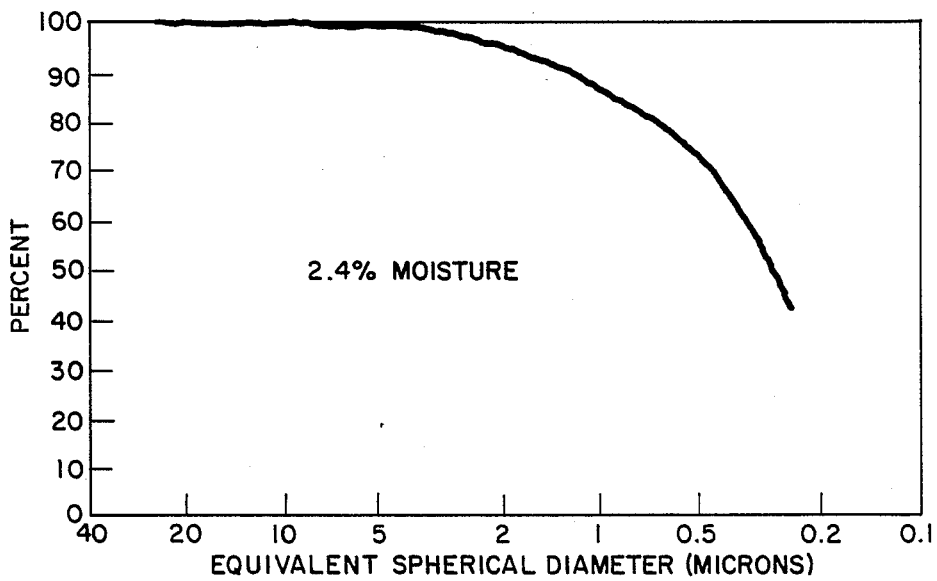
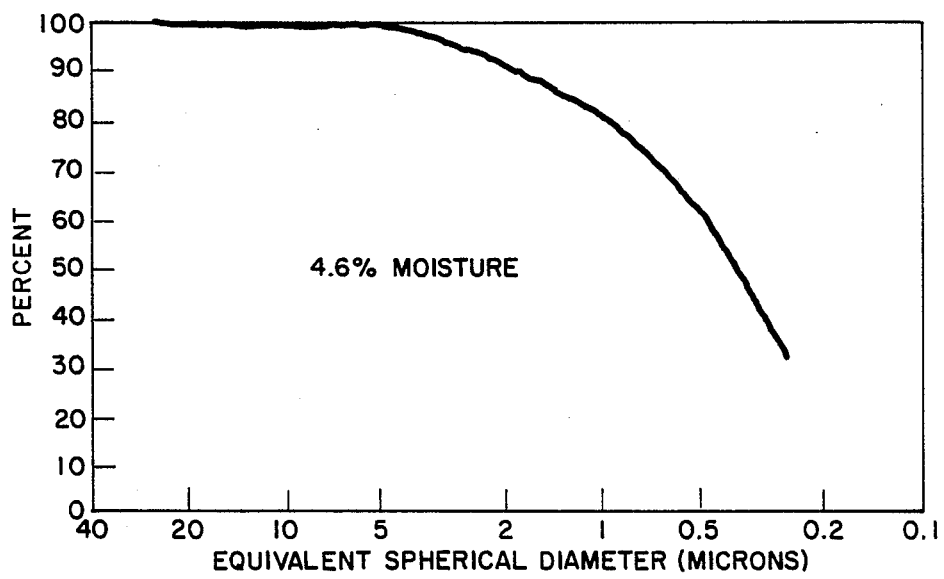

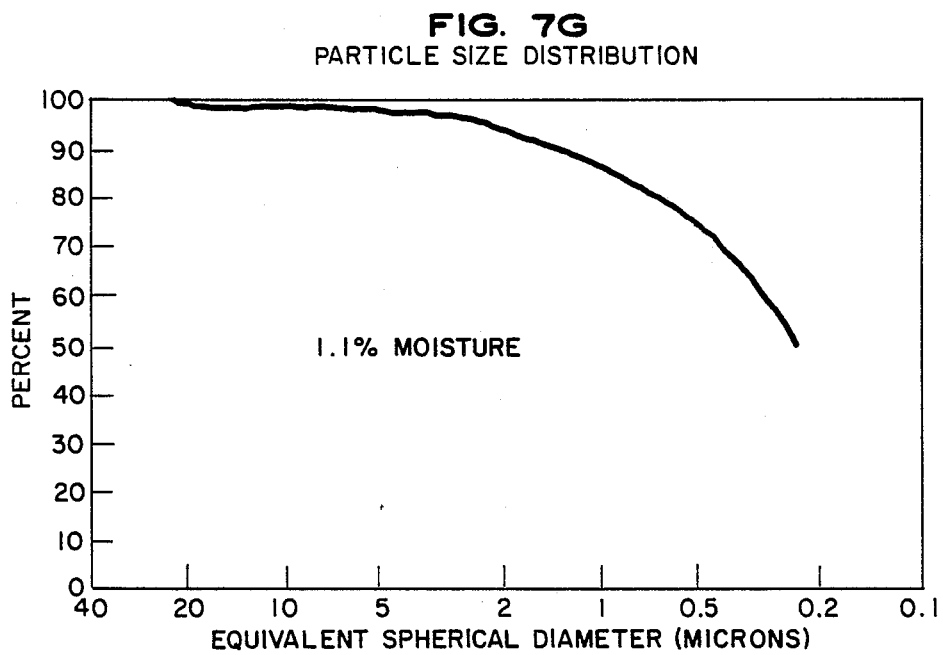
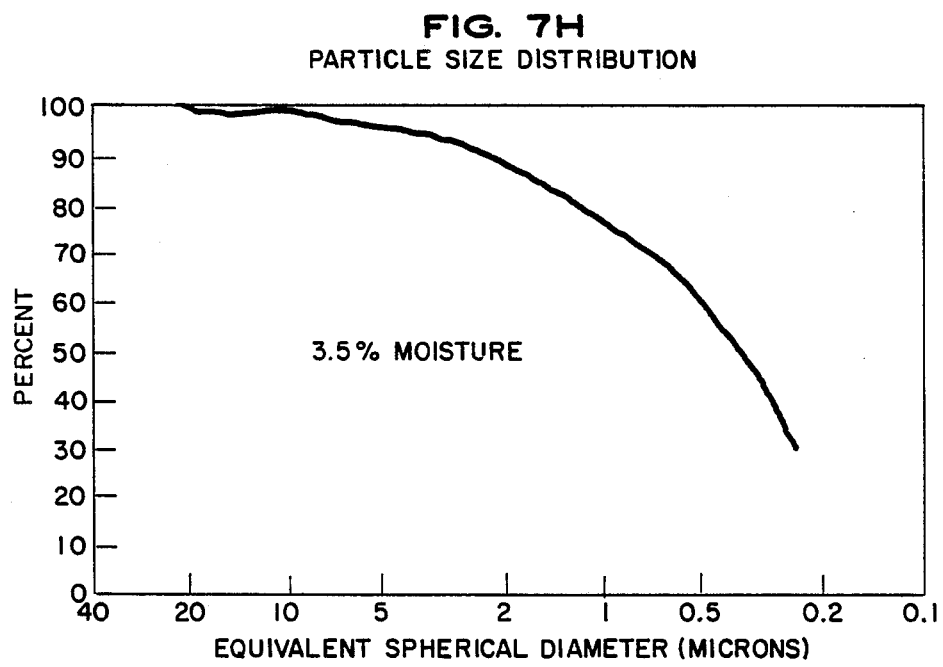

SILANE AGGREGATED KAOLINITE
PERCENT WET VOID VOLUME vs. % SILANE

SILANE AGGREGATED KAOLINITE
NORMALIZED LIGHT SCATTER vs. % SILANE

KAOLINITE AGGREGATION USING ORGANO-SILICON COMPOUNDS

This application is a continuation-in-part of U.S. Ser. No. 067,213 filed June 26, 1987, now U.S. Pat. No. 4,818,294.

FIELD OF THE INVENTION

This application relates to the preparation of chemically aggregated kaolinite using organo-silicon compounds. The products are useful as fillers and coatings for paper.

BACKGROUND OF THE INVENTION

Kaolinite based pigments are commonly used in paper industries for paper filling and paper coating applications. In general, the objectives of using the pigment are to improve paper qualities, such as opacity, brightness, smoothness, printing, porosity, surface coverage, light scatter, and to reduce the cost of paper manufacturing.

Both the brightness characteristics of the given kaolin and the opacifying properties of same when incorporated as a filler in paper, may be quantitatively related to a property of the filler identified as the "scattering coefficient S". The said parameter, i.e., the scattering coefficient S of a given filler pigment, is a property well-known and extensively utilized in the paper technology art, and has been the subject of numerous technical papers and the like. The early exposition of such measurements was made by Kubelka and Munk, and is reported in Z. Tech Physik 12:539 (1931). Further citations to the applicable measurement techniques and detailed definitions of the said scattering coefficient are set forth at numerous places in the patent and technical literature. Reference may usefully be had in this connection, e.g., to U.S. Pat. Nos. 4,026,726 and 4,028,173. In addition to the citations set forth in these patents, reference may further be had to Pulp and Paper Science Technology Vol. 2 "Paper", Chapter 3, by H. C. Schwalbe (McGraw-Hill Book Company, N.Y.).

In a filled paper, higher light scattering is therefore important. Increased light scatter allows paper to look more opaque without increasing light absorption. The use of pigment with a higher light scattering coefficient allows reduction in either the basis weight or amount of filler required to achieve targeted properties, for example, opacity and brightness. Traditionally, this has been achieved using titanium dioxide, calcined clays and precipitated calcium carbonate. The relatively higher light scattering of titanium dioxide is due to higher refractive index. Higher light scatter observed with calcined kaolin and precipitated calcium carbonate is believed to be due to the intrinsic porous structure developed during the process of manufacturing of these pigments. See McConnell et al, U.S. Pat. No. 4,381,948.

In general, the attempt to increase light scatter by modification of kaolinite mineral also induces some increase in pore void volume. In addition, such modification can produce pigments with particle size distribution in a fairly narrow range For example, calcining of fine kaolinite above its dehydroxylation point can produce a product with increased pore void volume. In U.S. Ser. No. 918,632 filed Oct. 14, 1986, similar aggregation is achieved chemically by reacting fine kaolinite clay with rapidly hydrolyzing metal chlorides. The acidic by-product of this reaction may be neutralized with gaseous ammonia. The light scattering coefficient and pore void volumes of these clays are significantly higher than the starting kaolinite material. Marginal increase in light scatter (generally less than 10 units) may be induced by mixing kaolinite particles of different size or by chemical flocculation. However, these structures are generally unstable and would break down under high shear stress of paper making or paper coating.

Aside from use as fillers, the aggregated pigments are used in paper coating to improve surface coverage. The application of such pigments can lead to a smoother surface, higher porosity, gloss and print properties. In the said patent application a chemically aggregated kaolin pigment is shown to significantly increase coated sheet properties, especially paper and print gloss.

In more detail, in U.S. Pat. No. 4,381,948 to A. D. McConnell et al, a calcined kaolin pigment is disclosed and a method for manufacture of same. The said pigment consists of porous aggregates of kaolin platelets, and exhibits exceptionally high light scattering characteristics when incorporated as a filler in paper. This pigment, which substantially corresponds to the commercially available product ALPHATEX® of the present assignee, E.C.C. America Inc. (Atlanta, Ga.), is prepared by first blunging and dispersing an appropriate crude kaolin to form an aqueous dispersion of same. The blunged and dispersed aqueous slurry is subjected to a particle size separation from which there is recovered a slurry of the clay, which includes a very fine particle size; e.g. substantially all particles can be smaller than 1 micrometer E.S.D. The slurry is dried to produce a relatively moisture-free clay, which is then thoroughly pulverized to break up agglomerates. This material is then used as a feed to a calciner; such feed is calcined under carefully controlled conditions to typical temperatures of at least 900° C. The resulting product is cooled and pulverized to provide a pigment of the porous high light scattering aggregates of kaolin platelets as described.

Calcined kaolin products, including those of the aforementioned ALPHATEX® type, are seen to be manufactured by relatively complex techniques involving a multiplicity of steps, including specifically a calcining step, plus various preparatory steps and post-calcining steps.

In U.S. Ser. No. 918,632 filed Oct. 14, 1986, a process is disclosed in which a fine particle size kaolin is reacted in particulate form with a metal chloride, such as silicon tetrachloride, to form a chemically aggregated structured kaolin pigment. The metal chloride may be one or more of the chlorides having the general formula $MCl_x$, where M is Si, Ti or Al; and X is 3 or 4 depending on the valence of M. Heating may optionally be used to shorten the reaction time. When so used, temperatures generally will not, however, exceed about 150° C. In order to complete the polymerization and condensation which is thought to occur, it is preferable to age the resulting product for a period, typically at least three days. In another aspect of that process, additional improvements in the products are found to occur by the addition of ammonia to the combined kaolin and metal chloride.

Thus said patent application describes methods of preparing chemically aggregated kaolinite mineral using very reactive metal chlorides such as silicon tetrachloride and titanium tetrachloride. The application of such reactive metal chloride leads to aggregated products that give enhanced optical and printability properties for both filled and coated papers. The resultant by-products (salts) are difficult to remove by ordinary methods. Both calcined structured pigments described in U.S. Ser. No. 918,632 filed Oct. 14, 1986 cannot be dispersed effectively in water at solids contents above 50 wt.%. This is a severe limitation to their transportation and use.

In this invention, aggregates similar to those in U.S. Ser. No. 918,632 may be produced by reaction with organo-silicon compounds that are non-corrosive, that produce no solid by-products, and have improved high shear rheology. These aggregates can be dispersed in water at 60–62 wt.% solids.

It is known from U.S. Pat. No. 3,567,680 to Joseph Iannicelli, assigned to J.M. Huber Corporation, issued Mar. 2, 1971, that mercaptopropyl silanes having the formula:

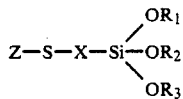  (1)

wherein Z is selected from the group consisting of hydrogen, cation, alkyl, aryl, alkylaryl, arylalkyl and derivatives thereof; X is selected from the group consisting of alkyl, alkylaryl, and arylalkyl; and $R_1$, $R_2$ and $R_3$ are selected from the group consisting of hydrogen, cation and alkyl, are suitable for modifying kaolin clays to enable them to be used as reinforcing fillers for elastomers. In fact the thus modified clays have been the candidates of choice for such fillers in commerce. It may be noted that in the Iannicelli disclosure, only the trialkoxy mercaptopropyl silanes are considered. This is necessary in order to build in hydrophobicity and the functionality desired. Hydrophobicity is required to aid dispersion of the inorganic filler particle in the organic polymer during compounding. Blends of these mercapto organosilanes with amino organosilanes are also disclosed.

In U.S. Pat. No. 3,364,059 to Marzocchi, a method for treating glass fibers to improve their bonding relationship to rubbers comprises treating them with a silane containing a thio group.

According to the present invention, the thio group and the amino group are not required. Sulfur-free and nitrogen-free organic silicon compounds are employed.

In U.S. Pat. No. 3,834,924 to Thomas A. Grillo, assigned to J.M. Huber Corporation, an amino organosilane is added to a high solids content pigment dispersion or slurry to change the slurry form into a thick, flocculated and plastic-type that is suitable for extrusion and drying. Because a thick, cake-like product is formed, the amino organosilane and pigment dispersion are preferably mixed or blended directly in a solids mixing apparatus such as an extruder, designed to extrude the plastic mass in the form of a compacted rod type body which may be fed directly into a drier. The products are useful as a filler for polyurethanes. As can be seen, the described treatment is for the different purpose of forming a flocculated, hydrophobic mass of the kaolin, not for the purpose of aggregating fine kaolin particles to form an aggregated structure which is dispersible in water.

In U.S. patent 3,894,882 to Robert B. Takewell et al, assigned to J.M. Huber Corporation, a rotating pelletizing drum is used to form pellets from clay such as kaolin clay. To avoid the problem of dust, a wetting liquid is introduced into the drum, preferably steam or steam/water. The steam adds heat to the pellets to aid in drying them. There is an incidental mention of using "other suitable wetting liquids", an extensive list being given which includes silanes.

In accordance with the foregoing, it may be regarded as an object of the present invention to provide an aggregated kaolin pigment product which possesses improved pigment bulk, porosity and light scattering characteristics, and hence is useful as a bulking pigment for coating of paper and paper board, and which may also be used as an opacifier and light scattering filler for paper and paper board as well as in other paper manufacturing applications.

It is also an object of the invention to provide a pigment product of the foregoing character which is prepared without calcination and therefore without subjecting the kaolinite to high temperatures, and which accordingly possesses low abrasiveness in accordance with the kaolinite feed from which it is produced.

Another object of the present method is to demonstrate application of substantially dry kaolin pigment in aggregation.

Yet another object is to demonstrate aggregation of

Yet another object is to demonstrate use of aggregated pigment made by the present invention in paper filling to enhance optical properties.

Yet another object is to show the application of such pigment in light weight coatings.

Yet another object is to show the production of the pigment in the presence of an aggregation enhancer such as calcium chloride.

It is a further object of the present invention to produce pigment that is free of soluble salts.

It is yet another object of the present invention to produce a pigment that, as a consequence of aggregation, can than 60% be processed to a slurry at a solids content higher by weight without unduly poor rheological consequences.

It is yet another object of the present invention to provide a process wherein aggregation efficiency, i.e. light scatter, is improved by application of gaseous ammonia.

· It is an object of the present invention to produce aggregated kaolinite pigment with minimum steps in producing said pigment.

It is also an object of the present invention to produce aggregated kaolinite pigment at relatively low cost compared with available such products.

SUMMARY OF THE INVENTION

The present invention comprises a method of producing aggregated kaolin pigments, specifically structured kaolin pigments, using organo-silicon compounds either singly or in combination. In general, the compounds may be selected from the following:

Symmetric Compounds

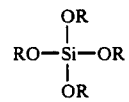

-continued
R = CH₃, C₂H₅
   C₃H₇, n-C₄H₉,
   sec-C₄H₉, C₆H₅

Asymmetric Compounds

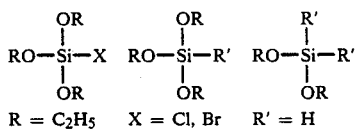

R = C₂H₅   X = Cl, Br   R' = H

In a typical process, substantially dry kaolin mineral is treated with small quantities of water and an effective amount of an organo-silicon compound such as silanes having the formula (RO)$_4$Si, where R is a lower alkyl group of 1 to 4 carbon atoms, e.g., methyl (CH$_3$), or ethyl (CH$_3$CH$_2$). The R groups in the silane can be the same or different. The resulting products exhibit increased light scatter, improved wet void volume and bulk. The aggregates seem to have a permanent structure that is strong enough to withstand the high shear forces of paper making and paper coating.

Aggregation enhancing chemicals, which may optionally be used, comprise alkaline earth metal chlorides and lithium chloride. Amounts used of this aggregation enhancing agent may be in the range of 0.05 to 3.0%, typically 0.05 to 2% by weight of the salt based on the weight of the dry kaolin.

Typically, feed moisture is in the range of 1 to 5%, preferably above 2.0 to about 5.0% by weight of the feed clay. The most preferred range is 2.5 to 4.0% by weight of the clay.

If the moisture level of the kaolin at the time of silane addition is not within the indicated range, said moisture can be added to the mixture following the silane chemical.

The amount of organic silicon compound may range from 0.1 to 5.0%, preferably from 0.2 to 2.0% by weight of dry kaolin.

BRIEF DESCRIPTION OF THE DRAWINGS

In FIG. 7A to 7H are shown the effect of moisture content on particle size.

Figure 1:
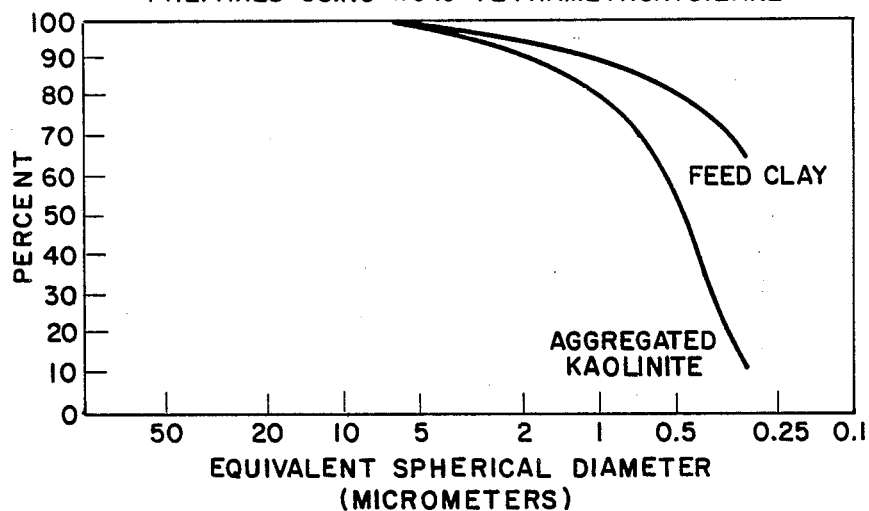
In FIG. 1 are compared the particle size distribution of the starting material and an aggregated product prepared using 1% tetramethoxysilane.
Figure 2:
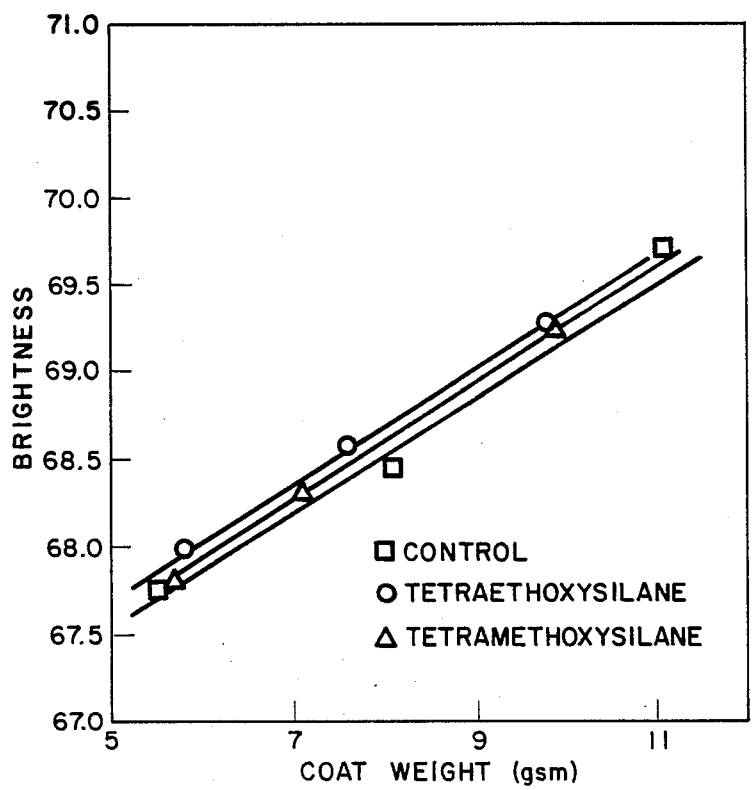
In FIG. 2 are plotted the brightness of coated sheets using aggregated pigments and a control consisting of fine clay and calcium carbonate.
Figure 3:
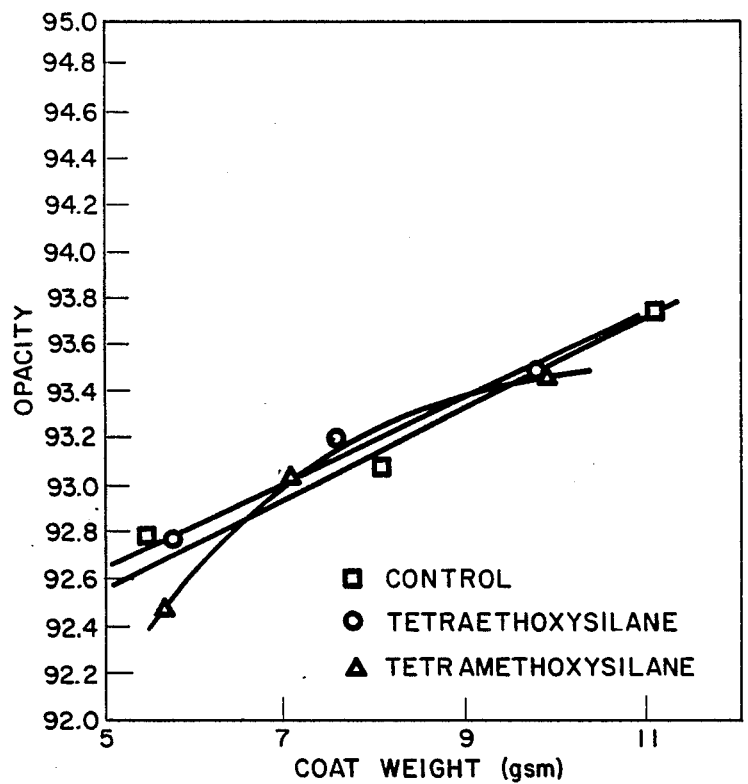
In FIG. 3 are plotted the opacity of coated sheets using aggregated pigments and a control consisting of fine clay and calcium carbonate.
Figure 4:
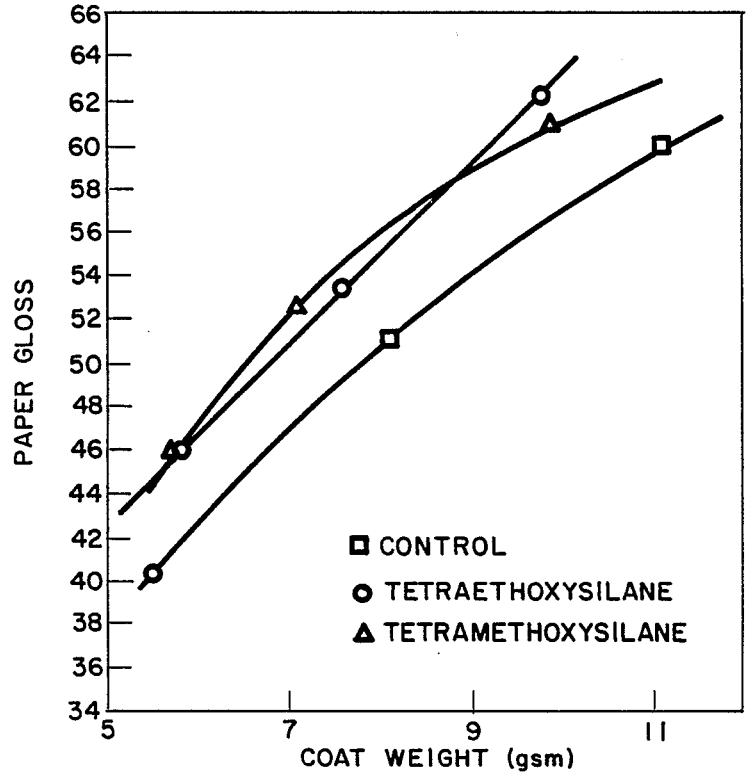
In FIG. 4 are plotted the paper gloss of coated sheets using aggregated pigments and a control consisting of fine clay and calcium carbonate.
Figure 5:
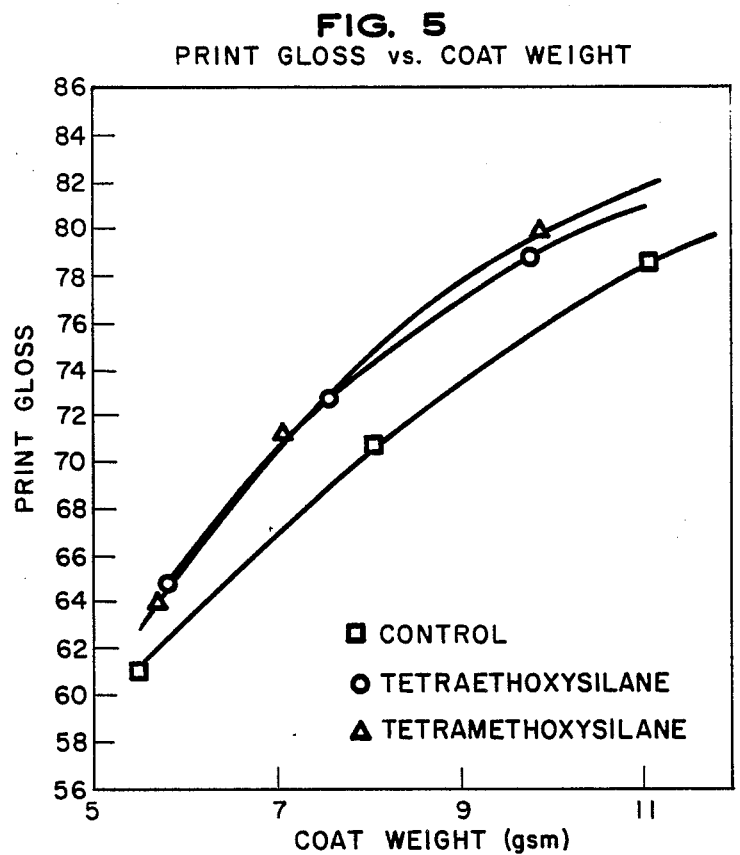
In FIG. 5 are plotted the print gloss of coated sheets using aggregated pigments and a control consisting of fine clay and calcium carbonate.
Figure 6:
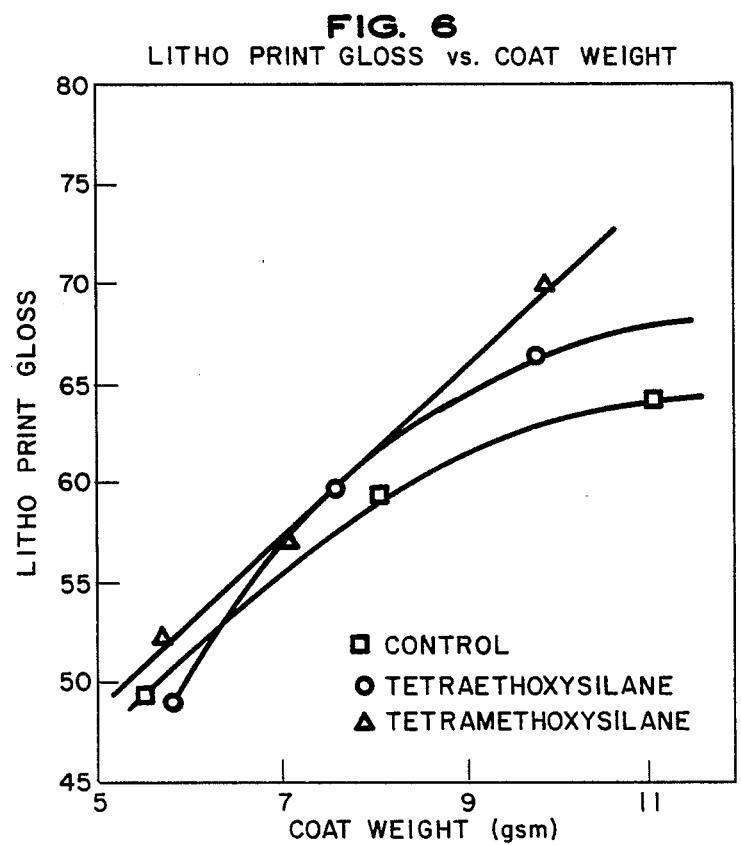
In FIG. 6 are plotted the litho print gloss of coated sheets using aggregated pigments and a control consisting of fine clay and calcium carbonate.

In the ensuing description, all scattering data are normalized by comparison to the scattering coefficient of samples of the aforementioned Alphatex ®. Ideally in a study of the present nature, the same batch of beaten pulp should be used throughout. As this is not practical, the method adopted was to fill one set of sheets in each series of tests using the same Alphatex ® from series to series. Statistically, the Alphatex ® filled samples at 10% filler had a scattering coefficient of 680 cm$^2$/gram, and in each series in which Alphatex ® differed from 680, the scattering coefficients of the experimental samples were accordingly adjusted proportionally to the bring its value to 680 cm$^2$/gram. This procedure, which was used in subsequent examples, is from time to time referred to in the specification as "normalizing" the scattering coefficients.

DETAILED DESCRIPTION

General Methods of Preparation of Feed Clay

This corresponds to preparation of the commercial product Betagloss ® of the assignee E.C.C. America Inc. (Atlanta, Ga).

The starting crude material was a blend of crude kaolins, which were derived from northeast Georgia, and which were comprised of very fine particle size materials. The GE brightness of the said crude was in the range of 82 to 87. In all instances in this specification it will be understood that brightness values are obtained according to the standard specification established by TAPPI procedure T-646 os-75.

The crude clays were beneficiated according to the general practice used in kaolinite processing industries. The beneficiated clays were classified by centrifugation to 94% less than 2 micrometer E.S.D. (equaivalent spherical diameter). The classified clays were flocculated using 0.25% by weight of aluminum sulfate and adjusting the pH to 3.5 with sulfuric acid. The flocculated kaolinites were filtered. The significantly dried (about 20% moisture remains) kaolinites were redispersed with 0.25% by weight of sodium polyacrylate and the pH adjusted to about 7.0. The redispersed kaolinite was spray dried.

This method of preparing feed clays is general and may be varied, particularly if so pointed out in specific Examples; the main variations are differences in particle size distribution and the addition of calcium carbonate.

Standard Method of Relative Sedimentation Volume Measurement

The relative sedimentation volume of treated and starting material was measured to determine the extent and nature of aggregation. In the procedure, a nearly 55% solids slurry of pigment was prepared that contained 0.3 milliliter of sodium polyacrylate. This slurry was then spun at 7000 rpm for 45 minutes. The sediment volume was calculated using dry weight of clay, wet weight of clay, and calculating volume of clay using density of dry clay of 2.6g/ml.

The invention is demonstrated in the following examples which are intended to be illustrative but not limiting.

EXAMPLE 1

The starting feed clay was prepared from a blend of two fine Northeastern crude clays from Georgia. The crude clays were refined by common commercial beneficiation methods. The refined clay was classified to 96% less than 2 micrometer E.S.D. The classified clay was blended with ground calcium carbonate (Carbital −90) at 3% weight of dry kaolinite. The blend was spray dried and pulverized using a pulverizer manufactured by Mikropul Corporation. This clay will be referred to as Feed Clay-I.

75 g. of substantially dry powder, moisture 0.85%, of Feed Clay-I was treated with 1% by weight of tetramethoxysilane (TMOS), supplied by Petrarch Chemical Co., with vigorous mixing in a Waring blender. Once the mixing of powder with liquid was completed, the clay was allowed to mix for an additional 1.5 minutes. Excess silane and resultant methanol as a by-product were removed by subjecting the clay to vacuum (nearly 30 torr). The above process with tetramethoxysilane was repeated once and the final product was allowed to dry at 150° C. for fifteen minutes.

The particle size distributions of the starting Feed Clay-I and the final product are illustrated in FIG. 1. The particle size distribution indicates formation of a structured aggregate with very narrow particle size distribution.

Handsheets were prepared using the above aggregated clay from bleached sulfite pulp. The sheets were filled at three filler loadings. The reflectivity of the handsheets was measured and converted to light scatter according to a modified Kabulka-Munk equation. The normalized light scatter of sheets filled at 10% filler loading with this product was 578 cm$^2$/g. This is a gain of 60 scatter units from untreated Feed Clay-I. The intraparticle porosity of the pigment, given as percent wet void volume and determined by the relative sedimentation method (RSV) was 57.3%. This is an increase of about 17 percentage units from the feed clay. The increase in wet void volume indicates the formation of aggregate structure and development of the permanent porosity.

EXAMPLE 2

The process and the chemical used were essentially identical to Example 1, except that the feed was a fine commercial clay, Betagloss. The particle size distribution and moisture of this feed clay were 94% less than 2 micrometer, and 0.85% respectively. The normalized light scatter of a sheet filled with the final aggregated product, at 10% filler loading, was 562 cm$^2$/g. Wet void volume of the product determined by RSV was 56.4%, an increase of about 16% percentage units over the feed clay.

EXAMPLE 3

The feed clay, aggregating agent and the mixing process were essentially identical to that of Example 2, except that the clay was treated with 0.45% by weight of ammonia gas following each evacuation step. The normalized light scatter of a sheet filled with this pigment, at 10% filler loading, was 550 cm$^2$/g. The wet void volume of the product, determined by RSV, was 56.7%. Wet void volume and scatter respectively are about 16 percentage units and 30 scatter units higher than the feed clay.

EXAMPLE 4

In this example Feed Clay-II was prepared by mixing 3% ground calcium carbonate with previously spray dried and pulverized Betagloss followed by drying at 150° C. for 15 minutes. The moisture of this feed clay-II was 0.68% by weight. The aggregating chemical and the treatment process were essentially identical to Example 1. The normalized light scatter of a sheet filled with this pigment at 10% filler loading was 585 cm$^2$/g, which is an increase of about 65 units over the feed clay. Wet void volume is about 16 percentage units higher than the feed clay, thus 55.9%.

EXAMPLE 5

Feed Clay-II was treated by the essentially identical method and chemicals described in Example 3. The normalized light scatter of a sheet filled with this pigment at 10% filler loading was 588 cm$^2$/g. There was an about 16.1 percentage units increase in wet void volume over the feed clay following the chemical aggregation, thus 56.1%.

EXAMPLE 6

The feed clay and the process of treatment were essentially identical to the method described in Example 2, except that the aggregating agent was an organo-silicon compound containing ethoxy groups. $(CH_3CH_2O)_4Si$ (TEOS). The normalized light scatter of a sheet filled with this pigment at 10% filler loading was 547 cm$^2$/g. The wet void volume of the product by RSV was 54.1%. Upon chemical aggregation, wet void volume and light scatter increased by about 14 percentage units and 27 scatter units respectively over the feed clay.

EXAMPLE 7

The feed clay, aggregating agent, and the treatment process all were essentially identical to the method described in Example 6 except that the clay was exposed to 0.45% by weight of ammonia immediately following the evacuation step as described in Example 3. The normalized light scatter of a sheet filled with this pigment at 10% filler loading was 544 cm$^2$/g. The wet void volume determined by RSV of the product was 54.9%.

EXAMPLE 8

The feed clay and process were essentially identical to the method described in Example 4 except that the aggregating chemical was tetraethoxysilane, $(CH_3CH_2O)_4Si$. The normalized light scatter of a sheet filled with this pigment at 10% filler loading was 570 cm$^2$/g. The relative sedimentation method showed the product to have 52.1 percent wet void volume. The increases in light scatter and wet void volume amount to 50 scatter units and about 12 percentage units over the feed clay, respectively.

EXAMPLE 9

The process and aggregating chemical were essentially identical to the method described in Example 7 except that Feed Clay-II was the starting material. The normalized light scatter of a sheet filled with this structured aggregated clay, at 10% filler loading, was 584 cm$^2$/g. In addition, the wet void volume determined by RSV was 54.4%, an increase of about 14 percentage units over the feed clay.

Table 1 summarizes the data from Examples 1 to 9, showing that at fixed moisture content both 0.45 wt.% ammonia gas and 3% calcium carbonate are desirable for optimum scatter in a filled handsheet.

TABLE 1

| Example # | Feed Clay | Chemical & Dose Level | +NH$_3$ (wt. %) | +CaCO$_3$ (wt. %) | Scatter cm$^2$ g$^{-1}$ |
| --- | --- | --- | --- | --- | --- |
| 1 | Clay-I | 1% TMOS | — | 3% | 578 |
| 2 | Betagloss | 1% TMOS | — | — | 562 |
| 3 | Betagloss | 1% TMOS | 0.45% | — | 550 |
| 4 | Clay II | 1% TMOS | — | 3% | 585 |
| 5 | Clay II | 1% TMOS | 0.45% | 3% | 588 |
| 6 | Betagloss | 1% TEOS | — | — | 547 |
| 7 | Betagloss | 1% TEOS | 0.45% | — | 544 |
| 8 | Clay II | 1% TEOS | — | 3% | 570 |
| 9 | Clay II | 1% TEOS | 0.45% | 3% | 584 |

EXAMPLE 10

The process, aggregating chemical and the feed clay all were essentially identical to the method described in Example 1, except that the moisture content of the feed clay was such that the molar ratio of water to silane was 4.69, which is equivalent to a moisture content of the feed clay of about 1.11% by weight. The relative sedimentation method showed the product to have 57.5 percent wet void volume.

This product was used to determine coated sheet properties of light weight coated offset grade paper. In the coating formulation, 30 parts of regular coating pigment were replaced with this produce. The typical formulation and relevant formulation properties are provided in Table 2.

TABLE 2
Formulations and Coating Formulation Properties

| Formulation Components | Control | Pigment A* 30 parts | Pigment B** 30 parts |
| --- | --- | --- | --- |
| #1 Clay | 75 parts | 60 parts | 60 parts |
| Calcium Carbonate | 25 parts | 10 parts | 10 parts |
| Latex | 10 parts | 10 parts | 10 parts |
| Starch | 4 parts | 4 parts | 4 parts |
| Nopcote C-104+ | 0.5 part | 0.5 part | 0.5 part |
| Sunrez ® 700 M++ | 0.12 part | 0.12 part | 0.12 part |
| Dispex N-40 | 0.1 part | 0.1 part | 0.1 part |
| pH | 7.6 | 8.0 | 8.1 |
| % Solids | 64.1 | 63.9 | 63.8 |
| Brookfield Viscosity 100 rpm (cps) | 880 | 1080 | 1040 |

*Prepared by using Tetramethoxysilane
**Prepared by using Tetraethoxysilane
+Coating lubricant (calcium stearate), product of Diamond Shamrock
++Insolubilizer Almost all of the coated sheet properties improved by application of this aggregated clay, for example, sheet gloss, print gloss and opacity. These coated sheet properties are illustrated in FIGS. 2 through 6. The properties, i.e. brightness, opacity, gloss, print gloss, and litho print gloss are compared with a common offset control formulation.

EXAMPLE 11

The feed clay and the process were essentially identical to the method described in Example 10, except that the aggregating chemical was (CH$_3$CH$_2$O)$_4$Si, tetraethoxysilane. The relative sedimentation method showed the product to have 51.9 percent wet void volume, an improvement of nearly 12 percentage units over untreated feed clay.

As in Example 10, this pigment was evaluated in a paper coating application. Once again, significant improvement of coated sheet properties is observed with this aggregated structure pigment. The essential coated sheet properties, e.g. brightness, opacity, gloss, print gloss, and litho print gloss are illustrated in FIGS. 2 to 6.

EXAMPLE 12

It is postulated that the hydrolysis, and subsequent polymerization of the hydrolyzed products, of the organo-silicon compound, e.g. silane, would depend on the availability of free moisture. One mole of silane requires four moles of water to fully hydrolyze. Diffusion and Polymerization requires further molecules of water on the clay surface according to the reaction scheme:

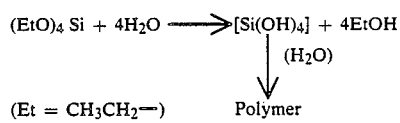

$$(\text{Et} = \text{CH}_3\text{CH}_2-)$$

Insufficient water will result in a slow or partial reaction, poor silicate polymerization and poor product properties that can only be enhanced by heat treating the product as in Example 1.

PART A

The effect of clay moisture content on the extent of aggregation was examined. The feed clay was samples of a South Carolina crude kaolin and the aggregating chemical was 2 wt.% TEOS. The said crude typically has a P.S.D. such that 70% or more of the particles by weight are less than ¼ micron E.S.D.

The kaolin feed moisture level of 1.0% or less was increased to a range of 3.5 to 4.5%, and a reaction with TEOS was completed as previously described in Example 8, but without any product heat treatment. Raising the moisture content produced a better product because it not only glued the particles together but it also formed a coarser product at the 0.25 micron. A higher Mercury Pore Volume was also obtained.

PART B

Samples of 2 wt.% TEOS treated clay (clay I) were post treated with water in the range 1 to 5 wt.%, so that the effective molar ratios of silane to water were in the range 1:5.5 up to 1:28; thus ensuring complete reaction of the silane. In this experiment water was sprayed in a fine mist onto the clay after it had been treated with TEOS for several days; again no heat treatment of the product was required. This water treatment also showed a significant increase in the Mercury Pore Volume and also increased the particle size. Both pore volume/radius and the removal of fines (aggregation) were observed. The most desirable moisture content is in the range 2.5 to 4.0 wt.%, with levels of <1.0% giving incomplete reaction and levels of >5.0% giving sticky and less readily handleable products.

FIGS. 7A to 7H show graphically the results obtained. All moisture contents are in weight percent.

Figure 7A:
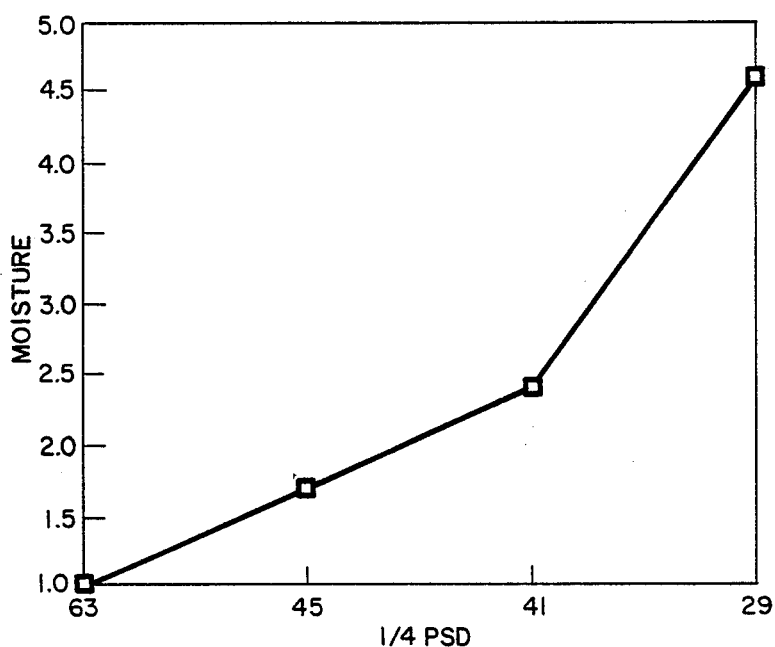
Figure 7B:
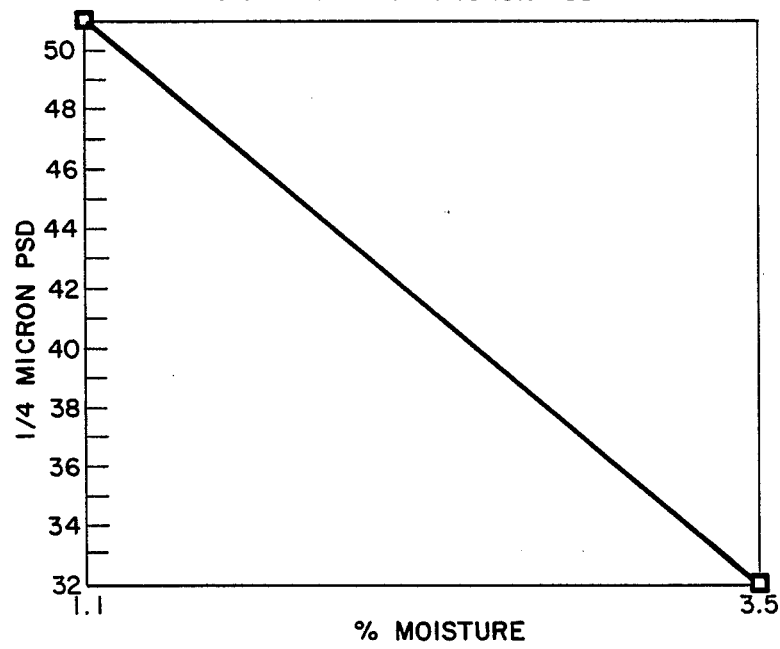

FIG. 7A shows, for Part A, the effect on 0.25 micron particle size distribution with variation in moisture content. It can be seen that the content of these fines decreases as the feed moisture content increases, particularly in the range of above 2.0% to 5.0%, most markedly in the range of 2.5% to 4.0%. FIG. 7B shows similar results for Part B.

Figure 7C:
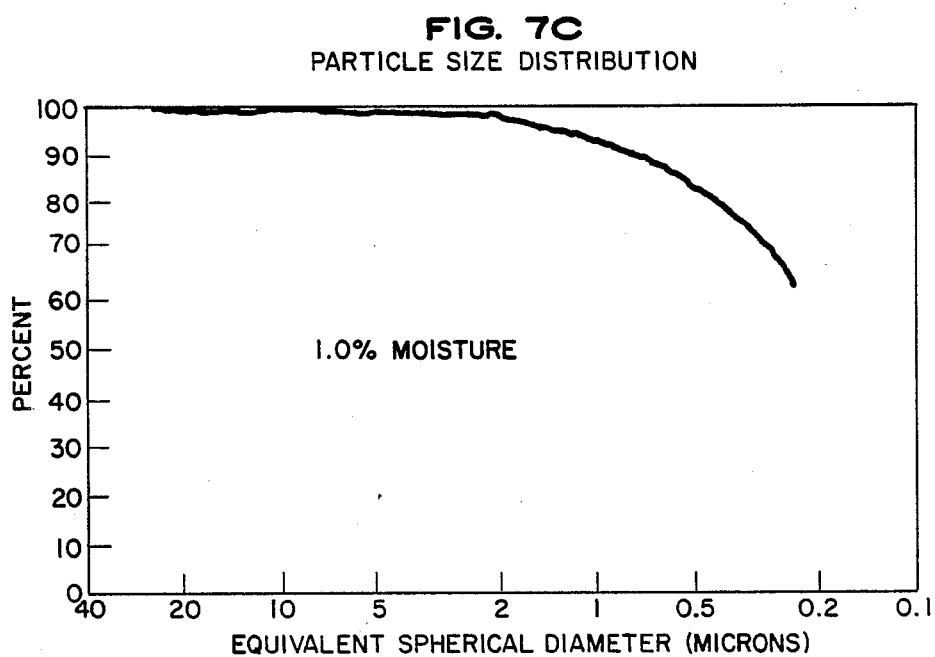

FIG. 7C shows, for Part A, that with a feed kaolin moisture content of 1.0%, 82% of the particles were less than 0.5 micron.

Figure 7D:
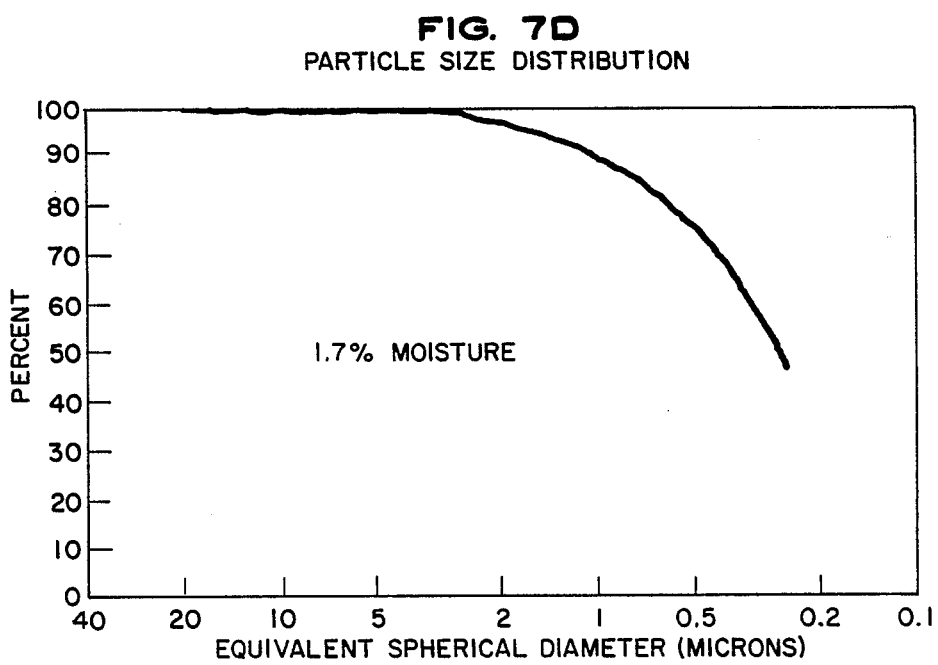

FIG. 7D shows that a feed moisture content of 1.7% reduced this figure to 74%; FIG. E with 2.4% moisture, to 73%; FIG. F with 4.6% moisture, to 62%.

FIG. 7G shows, for part B, that with a moisture content of 1.1%, 74% of the particles were less than 0.5 micron.

FIG. 7H shows that a moisture content of 3.5% reduced that figure to 60%.

EXAMPLE 13

The feed clay, aggregating chemical and part of the processing were identical to Example 8, the moisture of the feed clay being 1.08% by weight. In the process two separate 1 wt.% doses of TEOS were used with a time delay of 10 minutes prior to the repeat chemical treatment. The light scatter of a sheet filled with this product at 10% filler loading was 582 cm$^2$/g. Apparently higher residence time and chemical dose level are beneficial for developing a more effectively structured aggregate.

EXAMPLE 14

Figure 8:
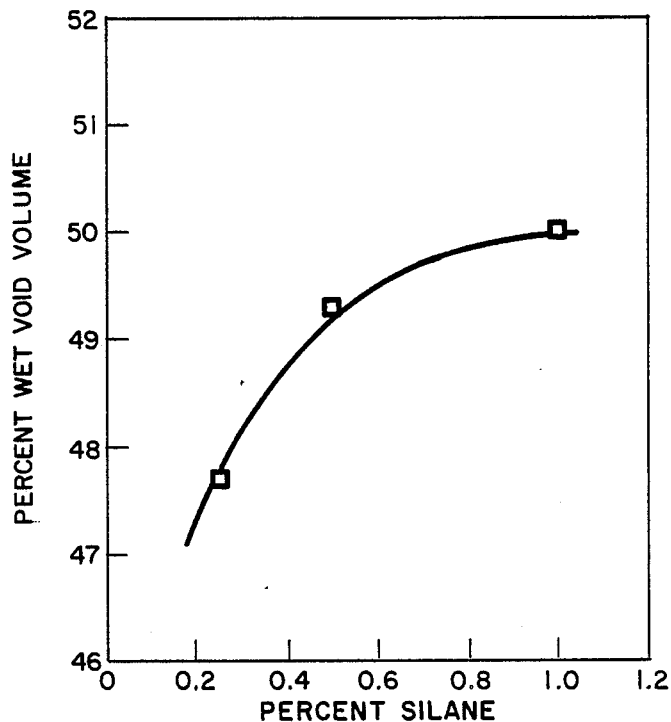
In FIG. 8 are plotted the percent wet void volume of aggregated pigments vs. amounts of the aggregating agent.
Figure 9:
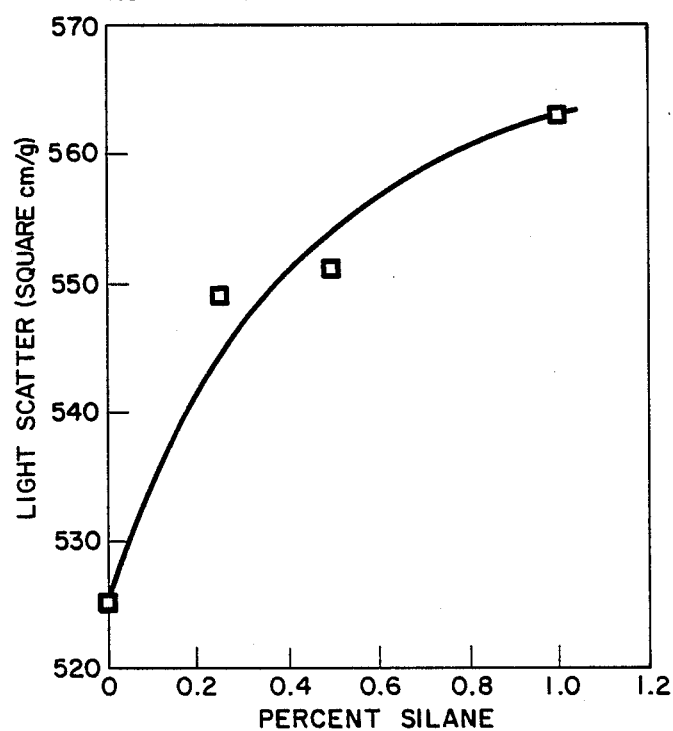
In FIG. 9 are plotted the light scatter of aggregated pigment vs. amounts of aggregating agent.

This example demonstrates the relation between the amount of aggregating agent vs. aggregate performance by keeping all other conditions the same. The starting material was a Feed Clay-I in which the moisture content was adjusted to 0.95% by weight. This feed clay was treated separately using a total of 0.25%, 0.5% and 1.0% by weight of tetraethoxysilane, (CH$_3$CH$_2$O)$_4$Si, according to the process described in Example 13, i.e., each silane dose was added in two equal portions as described. The normalized light scatter of a sheet filled with these pigments at 10% filler loadings and percent wet void volumes of these aggregated fillers are provided in Table 3. Also, the relation between the amount of aggregating agents vs. wet void volume and light scatter of filled sheets are illustrated in FIGS. 8 and 9 respectively. It is evident that the silane enhances these properties.

TABLE 3
Effect of Silane Concentration on the Properties of Aggregated Kaolinites Prepared Using Tetraethoxysilane

| Percent Chemical | Molar Ratio of Water to Silane | Normalized Light Scatter at 10% Filler Loading | Percent Wet Void Volume |
|---|---|---|---|
| 0.25 | 21.96 | 549 | 47.7 |
| 0.5 | 10.98 | 551 | 49.3 |
| 1.0 | 5.48 | 563 | 50.0 |

EXAMPLE 15

This example describes use of an aggregation enhancing agent, calcium chloride. In the process, Feed Clay-I was mixed with 0.5% by weight of dihydrated calcium chloride salt and the feed moisture was adjusted to 1.64% by weight of the clay. The chemical treatment process was identical to that of Example 14. 1.0% by weight of tetraethoxysilane was used. The normalized light scatter of a sheet filled with this pigment at 10% filler loading was 577 cm$^2$/g. The resulting product is more porous as indicated by the substantially higher wet void volume, 61.6% measured by RSV technique.

EXAMPLE 16

In this example, the effect of amount of aggregation enhancing agent is examined. The feed clay and the chemical treatment were identical to those described in Example 15, except that in a first set, feed clay was separately dosed with 0.2, 0.5 and 1.0% by weight of calcium chloride. In each case moisture of the feed clay was adjusted to nearly 1.3% by weight, after mixing Feed Clay-I with calcium chloride. Similarly, in a second set, feed clay was separately dosed with 0.05 and 0.1% by weight of calcium chloride except that the moisture of the feed clay was adjusted to 1.9% by weight. Each of these clays was treated with 0.5% by weight of tetraethoxysilane. The final products are porous aggregates as seen from wet void volume, measured by RSV technique. The wet void volumes are provided in Table 4.

TABLE 4
Effect of Calcium Chloride on Wet Void Volume of Chemically Aggregated Kaolinites

| Amount of Calcium Chloride (% by weight) | Feed Clay Moisture (% by weight) | Percent Wet Void Volume* |
|---|---|---|
| 0.05 | 1.9 | 51.1 |
| 0.1 | 1.9 | 51.1 |
| 0.2 | 1.3 | 53.0 |
| 0.5 | 1.3 | 62.5 |
| 1.0 | 1.3 | 62.9 |

The wet void volume of the feed clay was 40.2.

EXAMPLE 17

A combination of tetraethoxy- and tetramethoxy-silane was used in this example. The feed clay was identical to the one described in Example 1. The moisture of the feed clay was adjusted to 0.85% by weight. The chemical treatment process was essentially identical to the method described in Example 1 except that the composition of the aggregating agents consisted of 0.25% by weight of tetraethoxysilane and 0.05% by weight tetramethoxy-silane. The wet void volume of the final product, determined by RSV technique, was 51.4%. This is an increase of nearly 11 percentage units over the feed clay. The overall amount of chemical required is significantly lower than that required for similar aggregation using either tetraethoxy- or tetramethoxysilane alone.

EXAMPLE 18

A series of experiments was conducted using Feed Clay-I as a starting material. The moisture of the feed clay was adjusted to 1.0% by weight. Three separate portions, 75g each, were treated with 0.25% by weight of tetraethoxy-silane, (CH3CH20)4Si, according to Example 13, except that the time between each chemical treatment was increased to 15, 30 and 60 minutes. The normalized light scatter of handsheets filled with these pigments at 10% loadings is given in Table 5. In addition, the particle porosity measured as wet void volume is included in Table 5. In each case the light scatter and wet void volume improved significantly from the starting material. There appears to be little or no benefit to be gained for a time delay between the chemical additions used in this example.

TABLE 5

Effect of Time Delay Between Chemical Treatment Steps in the Aggregation of Kaolinite Using 0.25% Tetramethoxysilane.

| Delay Time (Minutes) | Normalized Light Scatter at 10% Filler Loading | Percent Wet Void Volume |
|---|---|---|
| 15 | 542 | 52.2 |
| 30 | 546 | 55.6 |
| 60 | 544 | 52.0 |

When used in paper coating applications, the structured kaolin pigments of the invention comprise from about 5 to 60% and preferably from about 10 to 30% by weight of the total pigment component of the coating composition. The balance of the pigment can comprise any of the known coating pigments, such as coating grades of kaolins, calcium carbonate, titanium dioxide, plastic pigments, etc. The coating compositions, in addition to the pigment component, include conventional components, such as an adhesive binder, dispersants, and other known additives.

Of particular importance in a coating formulation is the solids content. This controls the coat weight and other properties of the final sheet of paper. Any single pigment should ideally be capable of ≧60% solids in order to provide acceptable coating formulations. Furthermore, good high shear rheology is essential in order to give good runability. Some paper producers even cook their starch binder in the presence of pigment; this "jet-cooking" process is a severe test of a pigment's chemical stability. Calcined clays can only be formed into an aqueous suspension at some 40–50% solids, but possess good chemical stability. The products disclosed in U.S. Ser. No. 918,632 can only be formed into a suspension at ≦50% solids and do not possess good chemical stability during "jet-cooking" as shown below. Products of this invention cannot only be formed into a suspension at 60–62% solids but possess good chemical stability during starch cooking as can be seen from Example 19.

EXAMPLE 19

In this example a blend of coating pigments was mixed with raw starch (Penford gum 280) and cooked in a laboratory starch cooker. The formulations and viscosities before and after cooking are shown in Table 6, from which it can be seen that the products of this invention give accept able viscosities after cooking. This shows the chemical stability of these products and the flexibility they confer upon the paper coats. Up to 40 parts of the product of Example 13 can be starch cooked without any detrimental effects on rheology.

TABLE 6

| Pigment Formulation | Total Formulation Viscosity cps/100 rpm | |
|---|---|---|
| | Before Cooking | After Cooking |
| 75 Alphaplate*/25 KCS** | 106 | 1520 |
| 53 Alphaplate/17 KCS/30 product of USSN 918,632 | 1230 | 7200 |
| 53 Alphaplate/17 KCS/30 product of Example 13 | 88 | 1160 |
| 45 Alphaplate/15 KCS/40 product of Example 13 | 88 | 1120 |
| Total Formulation: | 100 parts pigment | |
| | 0.1 parts sodium polyacrylate dispersant | |
| | 8 parts starch (Penford Gum 280) | |
| | Water | |

TABLE 6-continued

| Pigment Formulation | Total Formulation Viscosity cps/100 rpm | |
|---|---|---|
| | Before Cooking | After Cooking |
| Solids content 60.7 wt. % | | |

*Delaminated coating clay product of Anglo-American Clays Corp.
**A No. 2 coating clay product of Georgia Kaolin Co.

While this invention has been particularly set forth in terms of specifics, it is understood in view of this disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. In a method for producing a kaolin pigment providing enhanced optical and printability properties when used in paper manufacture, which comprises mixing kaolin particles with an aggregating agent comprising an organic silicon compound selected from the group consisting of symmetric compounds having the formula

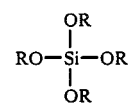

where R=CH$_3$, C$_2$H$_5$, C$_3$H$_7$, n-C$_4$H$_9$, sec-C$_4$H$_9$ and C$_6$H$_5$ and asymmetric compounds having the formula

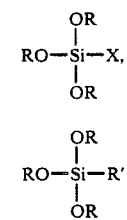

and

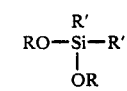

where R=C$_2$H$_5$, X=Cl or Br, and R'=H, and recovering an aggregated particulate kaolin pigment product, the improvement wherein the kaolin moisture content in the reaction mixture is in the range of above 2.0 to about 5.0% by weight.

2. The method according to claim 1 in which the feed kaolin moisture content is in the range of 2.5 to 4.0% by weight.

3. The method according to claim 1 in which the organic silicon compound comprises four hydrolyzable groups linked to silicon.

4. The method according to claim 1 in which the organic silicon compound is hydrolyzable to give liquid byproducts.

5. The method according to claim 1 in which the organic silicon compound is a silane having the formula (RO)$_4$Si in which R is an alkyl group.

6. The method according to claim 5 in which R is an alkyl group of 1 to 4 carbon atoms and the R groups in the silane can be the same or different.

7. The method according to claim 6 in which the silane is selected from the group consisting of tetramethoxy-silane and tetraethoxysilane and mixtures thereof.

8. The method according to claim 1 in which the kaolin particles are additionally mixed with an aggregation enhancing agent selected from the group consisting of alkaline earth metal salts and lithium chloride.

9. The method according to claim 8 in which the aggregation enhancing agent comprises a soluble salt of an alkaline earth metal ion.

10. The method according to claim 9 in which the aggregation enhancing agent comprises calcium chloride.

11. The method according to claim 1 in which the treatment with the organic silicon compound is repeated.

12. The method according to claim 1 in which the product is dried to shorten the time required for aggregation.

13. The method according to claim 1 in which the amount of the organic silicon compound is in the range of 0.1 to 5.0% by weight of the kaolin on a dry basis.

14. The method according to claim 13 in which the amount of the organic silicon compound is in the range of 0.2 to 2.0% by weight of the kaolin on a dry basis.

15. The method according to claim 8 in which the amount of the aggregation enhancing agent is in the range of 0.05% to 3.0% by weight of the kaolin on a dry basis.

16. The method according to claim 1 in which the treated kaolin is further treated by being exposed to ammonia.

17. The method according to claim 1 in which the feed kaolin comprises an air classified fine kaolin in which 80% of the particles are finer than 2 micrometers E.S.D.

18. The method according to claim 1 in which 96% of the feed kaolin particles are finer than 2 micrometers E.S.D.

19. The method according to claim 1 in which the kaolin particles are mixed with calcium carbonate.

20. A modification of the method of claim 1 in which kaolin particles treated with said aggregating agent are post treated with sufficient water to reach an amount within said range.

* * * * *

UNITED STATES PATENT AND TRADEMARK OFFICE
CERTIFICATE OF CORRECTION

PATENT NO. : 4,935,062
DATED : June 19, 1990
INVENTOR(S) : Alan J. Brown et al.

It is certified that error appears in the above-identified patent and that said Letters Patent is hereby corrected as shown below:

At column 4, line 25, following "aggregation of", insert -- kaolinite particle by dry processing routes. --.

At column 4, line 38, delete "than 60%".

At column 4, line 39, between the words "higher" and "by", insert -- than 60% --.

At column 13, line 50, in Example 19, correct "accept able" to read -- acceptable --.

Signed and Sealed this

Seventeenth Day of September, 1991

Attest:

HARRY F. MANBECK, JR.

*Attesting Officer*  *Commissioner of Patents and Trademarks*